United States Patent [19]
Iizuka et al.

[11] Patent Number: 4,677,516
[45] Date of Patent: Jun. 30, 1987

[54] DISK CARTRIDGE HAVING ELASTIC PIECES

[75] Inventors: Michio Iizuka, Saku; Haruo Shiba, Komoro, both of Japan

[73] Assignee: TDK Corporation, Tokyo, Japan

[21] Appl. No.: 746,318

[22] Filed: Jun. 19, 1985

[30] Foreign Application Priority Data

Jul. 7, 1984 [JP] Japan ............................ 59-102989[U]

[51] Int. Cl.[4] ...................... G11B 23/02; G11B 5/016
[52] U.S. Cl. ................................ 360/133; 360/130.34
[58] Field of Search ............ 360/133, 135, 137, 97–99, 360/130.34

[56] References Cited

U.S. PATENT DOCUMENTS 4,510,546 4/1985 Asami et al. ..................... 360/133

FOREIGN PATENT DOCUMENTS 1432193 4/1976 United Kingdom .
2100048 12/1982 United Kingdom .

*Primary Examiner*—John H. Wolff
*Attorney, Agent, or Firm*—Oblon, Fisher, Spivak, McClelland & Maier

[57] ABSTRACT

A disk cartridge comprises upper and lower hard casings whose inner surfaces are respectively attached with lining sheets and the upper and lower hard casings receives a magnetic disk in a rotatable manner. Elastic pieces are respectively provided on the inner surfaces of the upper and lower hard casings at opposing positions and each of the elastic members is interposed between a lining sheet and the upper and lower hard casings.

3 Claims, 15 Drawing Figures

FIGURE 3
*PRIOR ART*
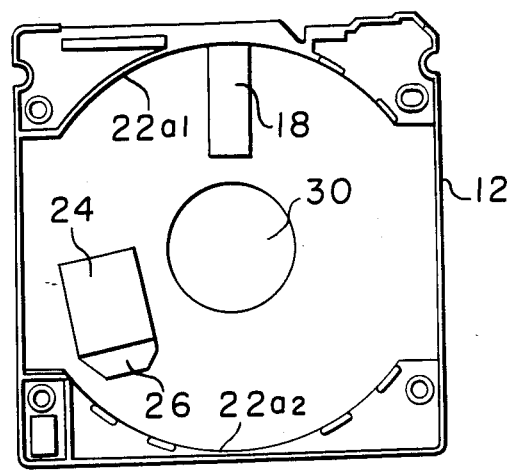
FIGURE 4 *PRIOR ART*
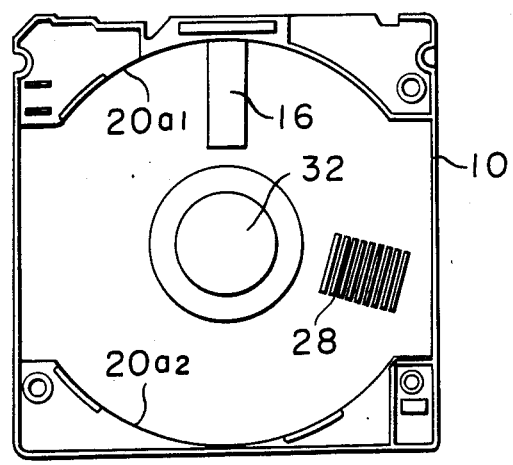

DISK CARTRIDGE HAVING ELASTIC PIECES

BACKGROUND OF THE INVENTION

The present invention relates to a micro-floppy disk being smaller than an ordinary floppy disk. More particularly, it relates to a disk cartridge using a hard casing instead of a thin jacket.

A floppy disk has been widely used as an exchangeable information storage medium which is removable for storage and transportation. A small-sized floppy disk which is smaller than an ordinary floppy disk is widely used for personal computers from the economical viewpoint. The floppy disk has a thin flexible jacket which is used as a casing to protect a magnetic disk. In consideration that the thin flexible jacket type floppy disk is insufficient to protect the magnetic disk, there has been proposed a disk cartridge in which a thick, hardly deformable, strong hard casing is used and lining sheets are attached to the inner surfaces of the hard casing to receive a magnetic disk in a rotatable manner.

FIG. 2 is a perspective view showing the outline of the conventional disk cartridge; FIG. 3 is a plan view showing the inner surface of a lower hard casing 12 of the disk cartridge and FIG. 4 is a plan view showing the inner surface of an upper hard casing 10 of the cartridge.

In the Figures, reference numerals 16, 18 respectively designate openings for receiving a writing-in and reading-out head, which are opened in the upper and lower hard casings 10, 12. The openings 16, 18 are closed by a cover 14 unless the openings are used for recording and reproducing. Reference numerals $20a_1$, $20a_2$ are respectively designate curved walls provided in the inner surface of the upper hard casing 10 to define a rotating region for a magnetic disk and numerals $22a_1$, $22a_2$ respectively designate curved walls provided in the lower hard casing 12 to define the rotating region for the magnetic disk. The curved walls $20a_1$, $20a_2$ and the curved wall $22a_1$, $22a_2$ are arranged in a symmetrical position in the upper and lower hard casings 10, 12. Therefore, when the casings are assembled, the curved walls $20a_1$, $22a_1$ and the curved walls $20a_2$, $22a_2$ are respectively matched with each other. A reference numeral 24 designates an elastic piece (a lifter) whose one end 26 is bonded in the rotating region of the lower casings 12 so that the major portion of the elastic piece 24 rises in a slanting state with respect to the rotating direction of the magnetic disk. A reference numeral 28 designates a projecting member for opposing the elastic piece, which is placed in the inner surface of the upper casing 10 at a substantially symmetrical position with respect to the elastic piece 24 in the lower casing 12. The projecting member 28 comprises a plurality of projections which are equidistant and parallel to the direction of rotation of the magnetic disk. A reference numeral 30 designates an opening for a driving hub of the magnetic disk, which is formed in the center of the lower casing 12 and a numeral 32 designates a bearing part provided at the center of the inner surface of the upper casing 10.

FIG. 5 is a cross-sectional view of the conventional disk cartridge which is fitted to a driving unit. A magnetic disk 34 is held in the assembled upper and lower casings 10, 12 in a rotatable manner. The magnetic disk has a driving hub 36 to which a driving shaft 38 of the driving unit (not shown) is fitted. A lower lining sheet 42 is bonded to the lower hard casing 12 at its outer peripheral portion except for a region where the elastic piece 24 is provided in the lower hard casing 12. An upper lining sheet 40 is also bonded to the upper hard casing 10 at its outer peripheral portion except for a region where the projecting member 28 is provided opposing to the elastic piece 24 in the upper hard casing 10. The upper and lower lining sheets 40, 42 cover the magnetic disk 34 to protect it and remove dust and foreign substances from the surfaces of the magnetic disk 34. The lower lining sheet 42 is pushed up by an elastic force of the elastic piece 24 at and near the position where the elastic piece 24 is provided. The upper lining sheet 40 is pushed down by the projecting member 24. Accordingly, the upper and lower lining sheets are brought into close-contact with the magnetic disk 34 so as to increase dust removing function. Reference numerals 44, 46 designate supporters for supporting the disk cartridge on the driving unit.

In the conventional disk cartridge, however, the upper and lower lining sheets 40, 42 are not always in close-contact with the magnetic disk 34 at or near the elastic piece 24 and the projecting member 28 even though the lining sheets cover the both surfaces of the magnetic disk. When the disk cartridge is operated on the driving unit, a bearing part 32 at the center of the upper casing 10 is pushed up by the top end of the driving shaft 38, whereby the distance between the inner surfaces near the central portion of the upper and lower casings 10, 12 is widened.

FIGS. 6 and 7 are enlarged cross-sectional views of the elastic piece 24 and the projecting member 28 of the disk cartridge in which FIG. 6 is a cross-sectional view taken along a line perpendicular to the direction of rotation and FIG. 7 is a cross-sectional view taken along a line along the direction of rotation.

In FIGS. 6 and 7, each projection of the projecting member 28 for supporting the elastic piece projects from the inner surface of the upper casing 10 at the same length. Accordingly, although the projections near the outer peripheral portion make the upper lining sheet 40 in close contact with the magnetic disk 34, there arises an air gap between the upper lining sheet 40 and the magnetic disk 34 in the vicinity of the central portion of the disk cartridge, with the result that the contact between them becomes weak. Accordingly, there is a problem that dust removing function on the upper surface of the magnetic disk 34 is poor at the position near the central portion of the magnetic disk even though the lower lining sheet 42 is in uniformly contact with the mangetic disk 34 from the inner diametrical portion to the peripheral portion by means of the elastic piece 24 provided in the lower casing 12.

SUMMARY OF THE INVENTION

It is an object of the present invention to eliminate the problem of the conventional disk cartridge and to provide an improved disk cartridge for performing efficient dust removing function even at the position near the central portion of the magnetic disk as well as the outer peripheral portion by such contruction that the upper and lower lining sheets are placed at a substantially corresponding position to the magnetic disk.

The present invention is to provide a disk cartridge comprising upper and lower hard casings whose inner surfaces are respectively attached with lining sheets, the upper and lower hard casings receiving a magnetic disk in a rotatable manner, characterized in that elastic members are respectively provided on the inner surfaces of the upper and and lower hard casings at an opposing position and each of the elastic member is interposed between the one lining sheet and the upper casing and between the other lining sheet and lower hard casing.

Preferably, the elastic members are in a substantially rectangular sheet-like shape and of resinous material. A part of each of the elastic member is bonded to the inner surface of the upper or lower hard casing.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is a plan view of an inner surface of a lower hard casing of the conventional disk cartridge;

FIG. 4 is a plan view showing the inner surface of the upper hard casing;

Preferred embodiments of the present invention will be described.

Figure 1:
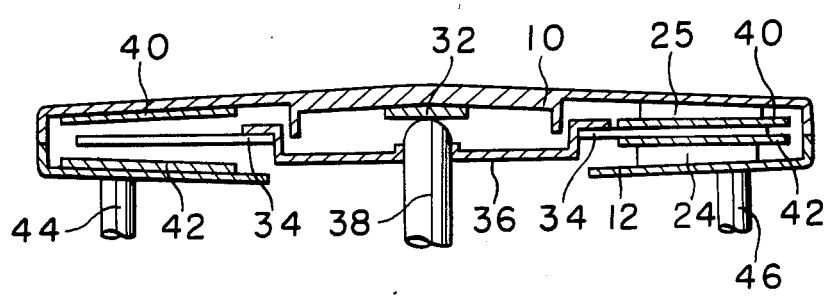
FIG. 1 is a cross-sectional view of an embodiment of the disk cartridge according to the present invention.
Figure 2:
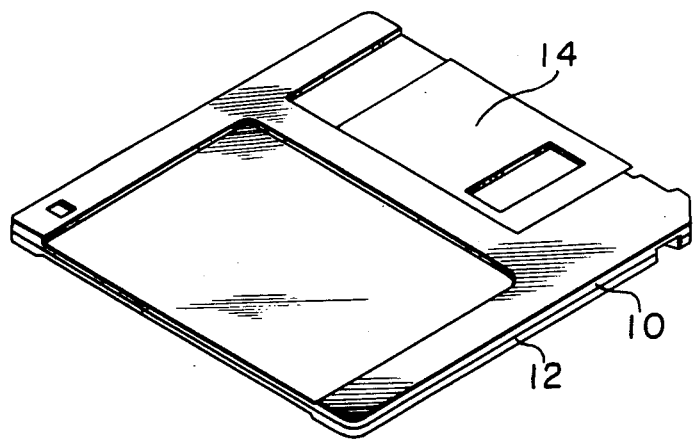
FIG. 2 is a perspective view of a conventional disk cartridge.
Figure 5:
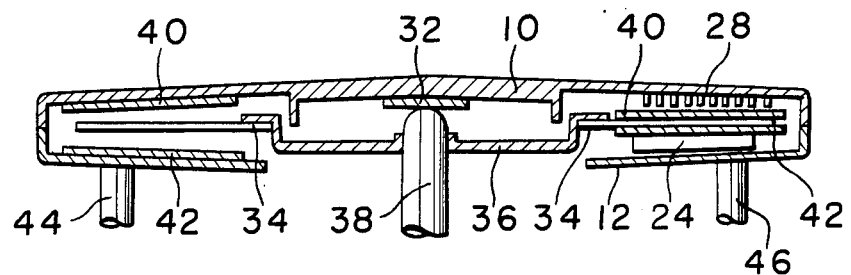
FIG. 5 is a cross-sectional view of the conventional disk cartridge.
Figure 6:
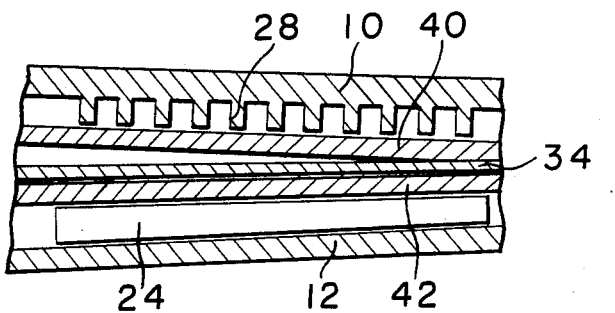
FIG. 6 is an enlarged cross-sectional view of the conventional disk cartridge taken along a line perpendicular to the direction of rotation in FIG. 5.
Figure 7:
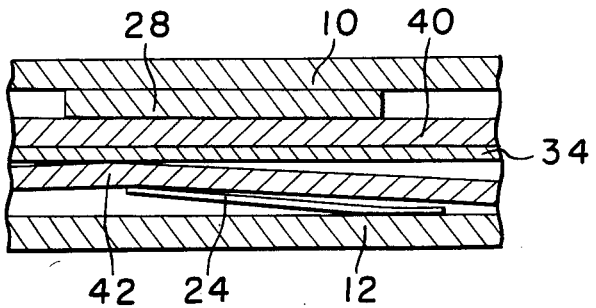
FIG. 7 is an enlarged cross-sectional view of the conventional disk cartridge taken along a line along the direction of rotation in FIG. 5.
Figure 8:
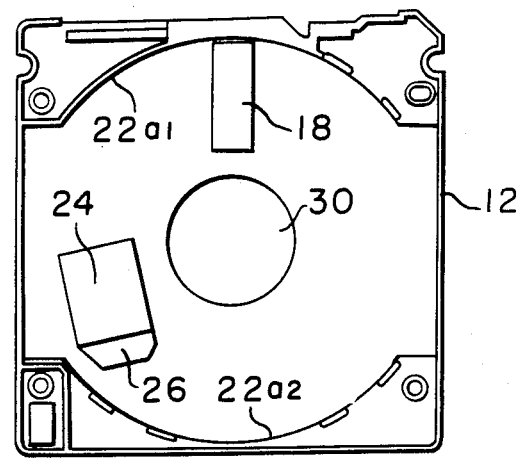
FIG. 8 is a plan view showing the inner surface of a lower had casing of an embodiment of the present invention.
Figure 9:
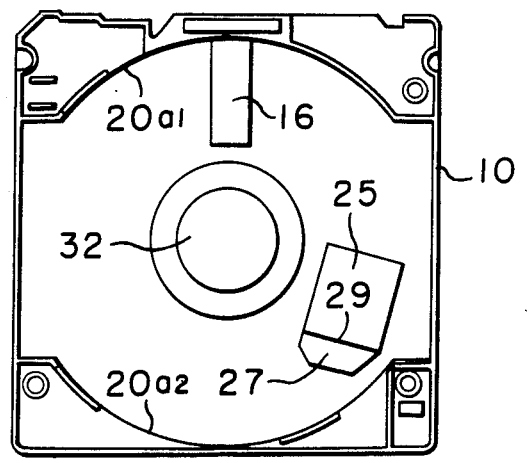
FIG. 9 is a plan view showing the inner surface of an upper hard casing of an embodiment of the present invention.
Figure 10:
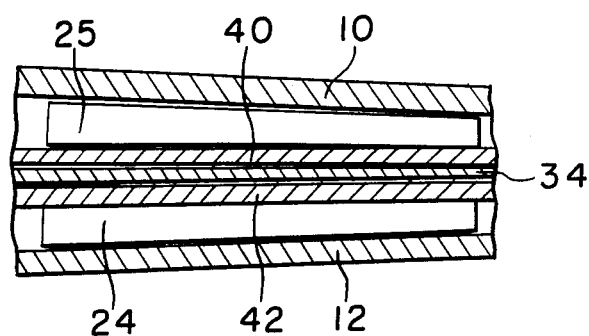
FIG. 10 is an enlarged cross-sectional view, taken along a line perpendicular to the direction of rotation, of an embodiment of the present invention.
Figure 11:
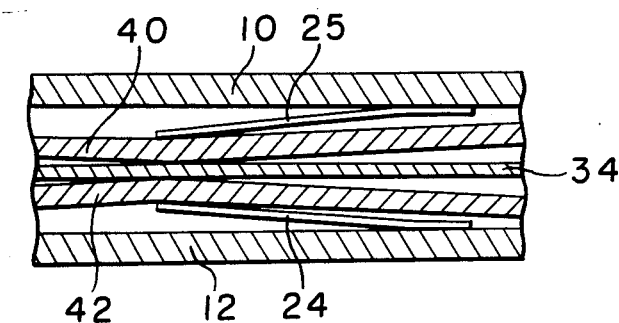
FIG. 11 is an enlarged corss-sectional view, taken along the direction of rotation, of the present invention.
Figure 12:
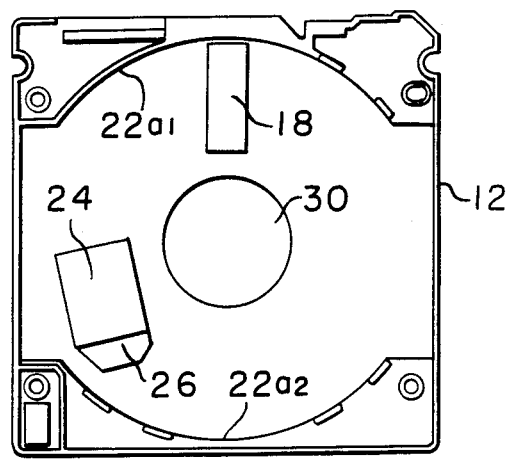
FIG. 12 is a plan view showing the inner surface of a lower hard casing of another embodiment of the present invention.
Figure 13:
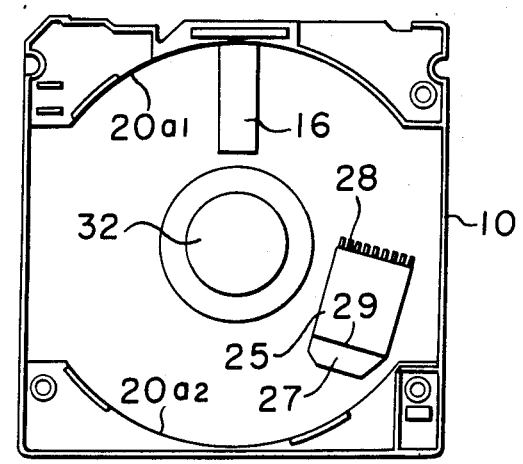
FIG. 13 is a plan view showing the inner surface of an upper hard casing of another embodiment of the present invention.
Figure 14:
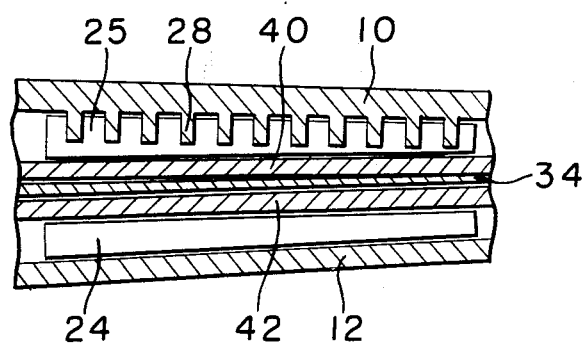
FIG. 14 is an enlarged cross-sectional view, taken along a line perpendicular to the direction of rotation, of another embodiment of the present invention.
Figure 15:
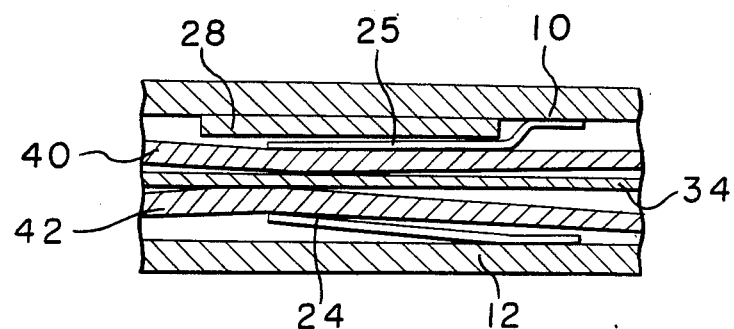
FIG. 15 is an enlarged cross-sectional view, taken along a line along the direction of rotation, of the other embodiment of the present invention.

FIG. 1 is a cross-sectional view showing the first embodiment of the present invention, in which a disk cartridge is fitted onto a driving unit. FIGS. 8, 9, 10 and 11 showing the first embodiment of the present invention respectively correspond FIGS. 3, 4, 6 and 7 showing the conventional disk cartridge. In the Figures, the same reference numerals designate the same or corresponding parts and therefore, description of these parts are omitted.

In comparison of the disk cartridge of the present invention with the conventional one, the elastic piece 24 and the projecting member 28 for supporting the elastic piece are respectively provided in the upper and lower hard casings 10, 12 at substantially opposing positions in the conventional disk cartridge. On the other hand, in the present invention, a further elastic piece 25 is provided in the upper hard casing 10 instead of the projecting member for receiving the elastic piece.

The elastic piece 25 may be a substantially rectangular sheet-like body made of resinous material such as polyethylene terephthalate. The configuration and construction are the same as the elastic piece 24. A part 27 of the sheet-like body 25 is bonded to a rotating region in the upper casing 10. A line 29 of bending is formed near the bonded portion 27 so that the major portion of the elastic piece 25 rises in slanting state to the magnetic disk 34 in the direction of rotation. Namely, the elastic piece 25 is used in a cantilever condition. Accordingly, it inherently imparts a repulsive force to the magnetic disk 34 in the direction perpendicular to the surface of the magnetic disk 34. Namely, there is a repulsive force to return the elastic piece in the original slanting position when force is applied to the elastic piece to change an angle of inclination. The free end of each of the sheet-like bodies 24, 25 entirely covers the surfaces in the radial direction of the magnetic disk 34.

Another embodiment of the present invention will be described.

FIGS. 12, 13, 14 and 15 respectively correspond FIGS. 8, 9, 10 and 11 of the first embodiment of the present invention. In Figures, the same reference numerals designate the same parts and therefore, description of the parts is omitted.

In this embodiment, an elastic member 25 comprises the projecting member 28 and the elastic piece 25. The projecting member 28 is provided at the free end of the elastic piece 25, a part of which is bonded to the upper hard casing. With the construction, the elastic piece 25 Z5 provided in the upper hard casing 10 is not only supported in the upper hard casing 10 by means of the bonded portion 27, but also is supported at the position near the extreme end portion of each of the projections of the projecting member 28. Accordingly, an elastic force of the elastic piece itself is increased and a pushing force is additionally applied by the projecting member 28 and the combined function given by these elements brings the upper lining sheet 40 to be in close-contact with the magnetic disk 34.

The elastic piece 24 may be made of a material such as polyester, sponge rubber, metal etc.

With the construction of the disk cartridge of the present invention, the elastic piece 24 provided in the lower casing 12 pushes up the lower lining sheet 42 by its elastic force to bring the lower lining sheet 42 in close-contact with the lower surface of the magnetic disk 34. The elastic piece 25 provided in the upper casing 10 pushes down the upper lining sheet 40 by its elastic force to bring the upper lining sheet 40 in close-contact with the upper surface of the magnetic disk 34. Since the elastic pieces 25, 24 are arranged in the inner surface of the upper and lower casings 10, 12 at substantially opposing positions, the elastic pieces 25, 24 elastically hold the upper and lower lining sheet 40, 42, whereby the upper and lower lining sheets 40, 42 between which the magnetic disk is interposed are in close-contact. Accordingly, when the lower lining sheet 42 is brought into close-contact with the lower surface of the magnetic disk 34 at its entire surface in the radial direction by means of elastic piece 24 provided in the lower casing 12, the upper lining sheet 40 can also be in close-contact with the upper surface of the magnetic disk 34 at its entire surface by means of the elastic piece 24 in the upper casing 10. Accordingly, dust on the magnetic disk can be sufficiently removed.

What is claimed is:

1. A disc cartridge comprising:
    a casing formed by upper and lower hard casings;
    upper and lower lining sheets respectively bonded to portions of inner surfaces of said upper and lower hard casings;
    a magnetic disc adapted for rotation and supported in said casing between said upper and lower lining sheets;
    an upper elastic piece positioned at a fixed location between said upper hard case and said upper lining sheet; and
    a lower elastic piece positioned at a fixed location between said lower hard casing and said lower lining sheet, said fixed locations being such that said upper and lower elastic pieces directly oppose one another with said upper and lower lining sheets and said magnetic disc therebetween;
    whereby said upper and lower elastic pieces maintain said magnetic disc in continuous contact with said upper and lower lining sheets regardless of variations in spacing between said upper and lower hard casings.

2. The disc cartridge of claim 1 wherein said elastic pieces are formed as sheet like bodies and wherein a portion of each said sheet like body is fixed to one of said upper and lower casings, whereby each said elastic piece is maintained in a cantelever state.

3. The disc cartridge of claim 1 including a projecting member extending from said inner surface of one of said upper and lower hard casings, wherein a corresponding one of said elastic pieces is fixed to said projecting member.

* * * * *